United States Patent [19]
Freund

[11] Patent Number: 6,076,174
[45] Date of Patent: Jun. 13, 2000

[54] SCHEDULING FRAMEWORK FOR A HETEROGENEOUS COMPUTER NETWORK

[75] Inventor: Richard F. Freund, Poway, Calif.

[73] Assignee: United States of America, Washington, D.C.

[21] Appl. No.: 09/026,879

[22] Filed: Feb. 19, 1998

[51] Int. Cl.[7] .................................................. G06F 13/00
[52] U.S. Cl. .......................... 714/47; 709/102; 709/105; 709/109; 709/225; 709/226
[58] Field of Search ............... 714/47; 709/102, 709/107, 105, 225, 226, 224; 395/672

[56] References Cited

U.S. PATENT DOCUMENTS

| | | | |
|---|---|---|---|
| 5,381,534 | 1/1995 | Shi | 709/303 |
| 5,524,253 | 6/1996 | Pham et al. | 709/202 |
| 5,559,933 | 9/1996 | Boswell | 375/222 |
| 5,797,010 | 8/1998 | Brown | 209/203 |
| 5,852,631 | 12/1998 | Scott | 395/712 |
| 5,926,636 | 6/1999 | Lam et al. | 358/115 |

OTHER PUBLICATIONS

"SuperC or Distributed Heterogeneous HPC", R.F.Freund, Computing Systems in Engineering vol. 2, No. 4, pp349–355, 1991.
"Cluster–M Paradigms for High–Order Heterogeneous Procedural Specification Computing", Freund, 1992, IEEE.
"Scalable Heterogeneous Programming Tools", Song Chen et al, IEEE, 1994.
"Superconcurrent Processing", Freund, TD 1781, Mar. 1990.
"Optimal Selection Theory for Superconcurrency", Freund, TD 1669 Oct. 1989.
"Superconcurrent Processing—A Dynamic Approach to Heterogeneous Parallelism", Freund, Naval Ocean Systems Center, Jul. 1990.
"Panel: Whither Massive Parallelism?", Howard Jay Siegel, Purdue Univ., School of Electrical Enginering 1992.
"HAsP—Heterogeneous Associative Processing", Freund et al, Computing Systems in Engineering vol. 3, Nos. 1–4, pp. 25–31, 1992.
"Avoiding Unnatural Acts", Freund et al, Supercomputing Review 1992.
"Work–Based Performance Measurement and Analysis of Virtual Heterogeneous Machines", Ambrosius et al, International Parallel Processing Sym., Honolulu 1996.
"Heterogeneous Processing", Freund et al, IEEE Computer, Jun. 1993.
"Object Oriented Simulation Conference", Peterson et al, SCS Multiconference in Tempe, AZ 1994.
"Preliminary Investigation into the Application of SmartNet to the Joint Maritime Command Information System", Freund et al, Jun. 1996.
"Generational Scheduling for Heterogeneous Computing Systems", Carter et al, International Parallel Processing Symposium, Honolulu 1995.
"If the Network is the Computer, Then . . . " Freund et al, Supercomputing Review, Oct. 1991.

*Primary Examiner*—Robert W. Beausoliel, Jr.
*Assistant Examiner*—Wasseem H. Hamdan
*Attorney, Agent, or Firm*—Harvey Fendelman; Michael A. Kagan; Eric James Whitesell

[57] ABSTRACT

A scheduling framework for a heterogeneous computer network comprises a task performance predictor for estimating computation time on each computer in a network for each job input to the network, a performance characteristics database for recording information about each component of the network including the performance history of each computer in the network for each job, an administrative interface for entering scheduling information, editing the performance characteristics database, selecting real-time or simulated operation, and for monitoring network performance, a user interface for specifying constraints on the execution of a particular job, a scheduler for assigning the jobs to the computers in the network, and a controller for responding to network events and for relaying scheduling information to the network and network status messages from the network.

8 Claims, 3 Drawing Sheets

Microfiche Appendix Included
(1 Microfiche, 26 Pages)

SCHEDULING FRAMEWORK FOR A HETEROGENEOUS COMPUTER NETWORK

LICENSING INFORMATION

The invention described below is assigned to the United States Government and is available for licensing commercially. Technical and licensing inquiries may be directed to Harvey Fendelman, Legal Counsel For Patents, SPACE AND NAVAL WARFARE SYSTEMS CENTER SAN DIEGO CODE 0012 Room 103, 53560 Hull Street, San Diego, Calif. 92152-5765; telephone no. (619)553-3001; fax no. (619)553-3821.

MICROFICHE APPENDIX

This application contains a Microfiche Appendix having 1 microfiche and 26 frames.

BACKGROUND OF THE INVENTION

The present invention relates to resource management in distributed computer networks. More specifically, but without limitation thereto, the present invention relates to a scheduling framework for assigning a set of problems to computers in a heterogeneous computer network to achieve a substantially optimal matching of the problems to the computers to minimize the amount of time required to solve the problems.

In recent years networks of distributed computers have emerged to support high performance computing as an alternative to various monolithic parallel machines such as Cray and Paragon. Two approaches based on workstations are generally referred to as COW's (clusters of workstations) and NOW's (network of workstations). Another approach called heterogeneous computing attempts to combine the best of the cluster and network approaches by efficient use of diverse machines. This technique may offer great potential but requires intelligent orchestration of the tasks to match the resources. Distributed computing environments (DCE's) and resource management systems (RMS's) have primarily arisen from the NOW/COW arena. DCE's such as PVM (parallel virtual machines) and CRONUS (an object-oriented distributed computing environment commercially available for the development of large-scale distributed heterogeneous applications) and resource management systems (RMS's) such as Condor and LoadLeveler can carry out a distributed policy but do not necessarily create an intelligent policy or schedule. Most of these DCE's and RMS's rely on load-balancing (next task to the next available machine) which increases the usage of the machines, but does not necessarily minimize the total time to solve a problem.

A continuing need therefore exists for an intelligent scheduling framework for heterogeneous computer networks that can minimize the throughput time required for solving a set of computational tasks.

SUMMARY OF THE INVENTION

The scheduling framework for a heterogeneous computer network of the present invention is directed to overcoming the problems described above, and may provide further related advantages. No embodiment of the present invention described herein shall preclude other embodiments or advantages that may exist or become obvious to those skilled in the art.

A scheduling framework for a heterogeneous computer network of the present invention comprises a task performance predictor for estimating computation time on each computer in a network for each job input to the network, a performance characteristics database for recording information about each component of the network including the performance history of each computer in the network for each job, an administrative interface for entering scheduling information, editing the performance characteristics database, selecting real-time or simulated operation, and for monitoring network performance, a user interface for specifying constraints on the execution of a particular job, a scheduler for assigning the jobs to the computers in the network, and a controller for responding to network events and for relaying scheduling information to the network and network status messages from the network.

An advantage of the scheduling framework of the present invention is that complex problems may be solved by a heterogeneous computer network at a lower cost than by a single supercomputer.

Another advantage is that the scheduling framework readily accommodates popular components of existing resource management systems.

Yet another advantage is that the scheduling framework gracefully accommodates changes in the network configuration, avoiding the expense of redundant systems.

Still another advantage is that the performance of the scheduling framework may be monitored on a speedometer-odometer display.

Another advantage is that the scheduling of jobs may be simulated using compute characteristics and other network information available from the performance characteristics database.

Still another advantage is that the scheduling framework characterizes the uncertainty of a computer's performance of a particular task in the presence of the other computers in the network.

The features and advantages summarized above in addition to other aspects of the present invention will become more apparent from the description, presented in conjunction with the following drawings.

BRIEF DESCRIPTION OF THE DRAWINGS AND APPENDIX

Appendix A is a microfiche of a computer program source code listing embodying an exemplary scheduling framework of the present invention.

DESCRIPTION OF THE INVENTION

The following description is presented solely for the purpose of disclosing how the present invention may be made and used. The scope of the invention is defined by the claims.

Figure 1:
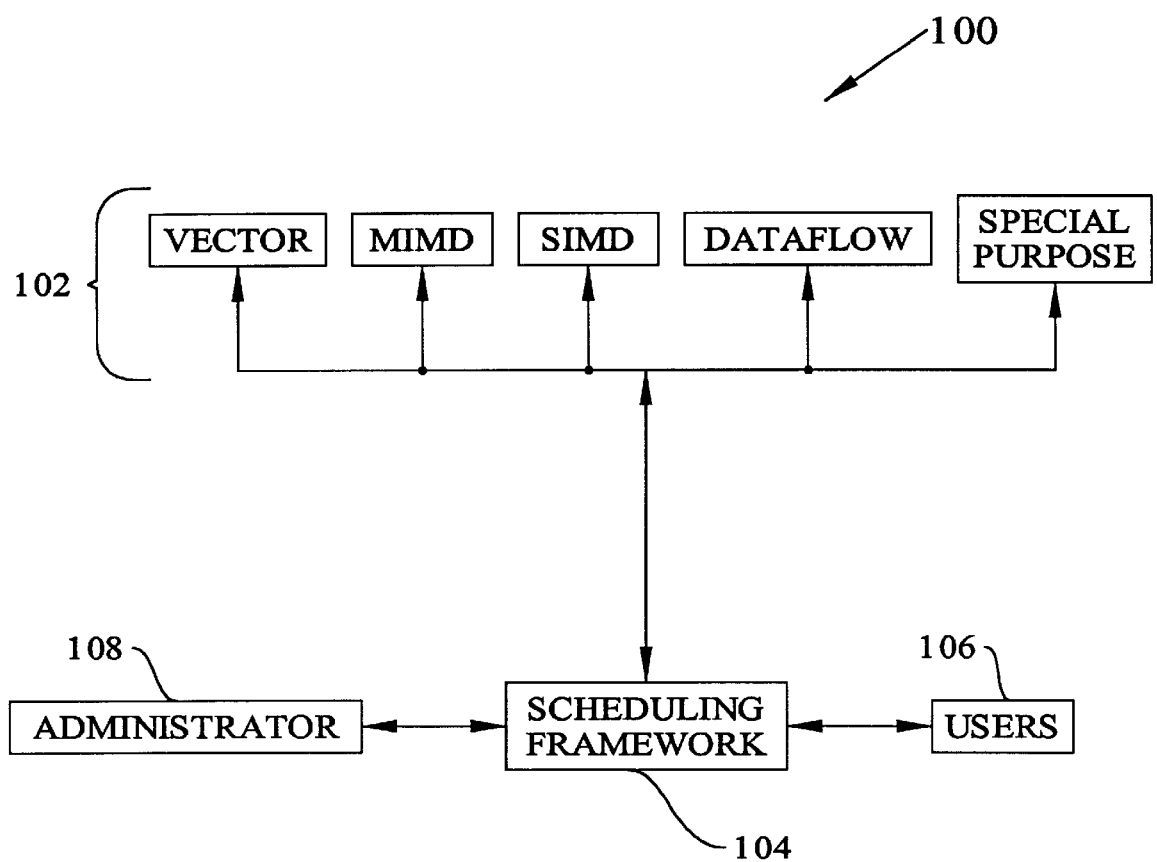
FIG. 1 is a diagram of a typical heterogeneous computer network.

A typical heterogeneous computer network 100 is diagrammed in FIG. 1. Each computer 102 typically has a different architecture that is best suited to certain types of problems. For example, a vector machine would work best for vectorizable code, but non-vectorizable code could be solved more efficiently on an MIMD (multiple instructions on multiple data), SIMD (single instruction on multiple data), Dataflow, or a Special Purpose machine. Scheduling framework 104 accepts requests from users 106 to execute a job or a sequence of jobs, assigns the jobs to particular machines in network 102, and reports job execution status to administrator 108.

Figure 2:
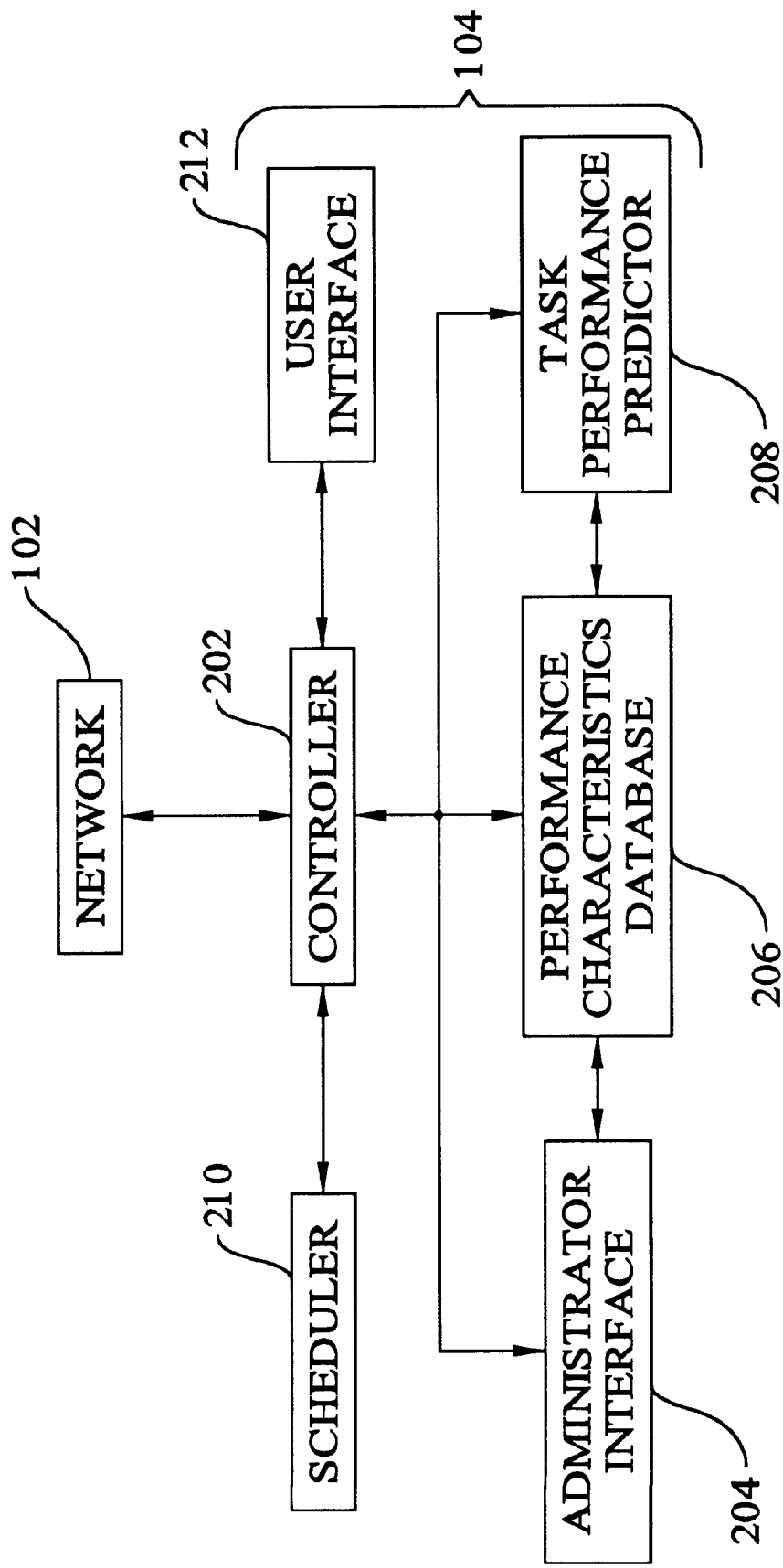
FIG. 2 is a diagram of a scheduling framework of the present invention.

In FIG. 2, scheduling framework 104 comprises a controller 202, an administrator interface 204, a performance characteristics database 206, a task performance predictor 208, a scheduler 210, and a user interface 212.

Controller 202 interfaces network 102 with administrator interface 204, performance characteristics database 206, task performance predictor 208, scheduler 210, and user interface 212.

User interface 212 allows a user to request that a job or a set of jobs with sequential constraints be executed where the jobs may have different user-specified priorities.

Task performance predictor 208 calculates an estimated time to compute for each job input to controller 202 from information about each machine and its performance history stored in performance characteristics database 206.

Performance characteristics database 206 contains a set of data objects comprising site objects, machine objects, model objects, model machine objects, and override objects. Site objects include information about a computer site such as the site name, site description, latitude, longitude, network bandwidth, network latency, actual/planning mode, and idle/used status.

Machine objects include information about a machine such as the machine name, its architecture, Internet Protocol (IP) address, description, location, relative cost, relative performance rate, actual/planning mode, and the name of the machine site.

Model objects include information about a job, such as the model name, a scheduling constraint, machine description, number of compute characteristics, and compute characteristics.

Model machine objects include information about theoretical machines such as the machine name, model name, theoretical compute time function, theoretical network latency time function, theoretical floating point time function, relative execution rate, network experiential data, and compute experiential data.

Compute experiential data includes the number of compute experiential data, a mean, a variance, an upper bound, a data count, a sum of squares, the number of compute characteristics, and compute characteristics.

Override objects include model name, machine name, an execution equation, a data use equation, a network equation, a compute weight, a network weight, a theoretical execution weight, an experiential execution weight, an override execution weight, theoretical network weight, experiential network weight, and an override network weight.

Compute characteristics are the parameters of a job that influence the runtime of the job. For example, if a job requires the name of a file from which data is read, the parameters of the job may include the data in that file. Task performance predictor 208 obtains a runtime distribution from performance characteristics database 206 using a combination of actual experiential data as well as functions of compute characteristics optionally input via user interface 212. Compute characteristics are positionally ordered in the model object, and may be used in model machine object functions. If used in a model machine function, the compute characteristic strings may be interpreted as numerical values and plugged into the model machine object and other functions at positional placeholders such as $0, $1, etc. before evaluation of the respective functions. The compute characteristics mechanism may also be used to communicate how a job is invoked to further tune the performance of task performance predictor 208 in predicting the job's runtime, for example by changing the values plugged into the model machine object equations.

When a job or a sequence of jobs is submitted to scheduling framework 104 via user interface 212, task performance predictor 208 calculates an expected time to compute from a matrix of performance information for each computer in network 102. The matrix may include information read from performance characteristics database 206.

Scheduler 210 inputs scheduling strategy information from administrator interface 204 and task performance predictor 208 outputs a schedule for each job to controller 202. Controller 202 assigns each job to the computer in network 102 determined to be the best choice by task performance predictor 208 and scheduler 210. Scheduler 210 may continually update the schedules including those that have already started running to keep each job schedule as efficient as possible.

Controller 202 fits newly submitted tasks into the current queue of tasks and initiates rescheduling in response to network configuration changes, for example, computer resource malfunctions and resources added to or removed from network 102.

Figure 3:
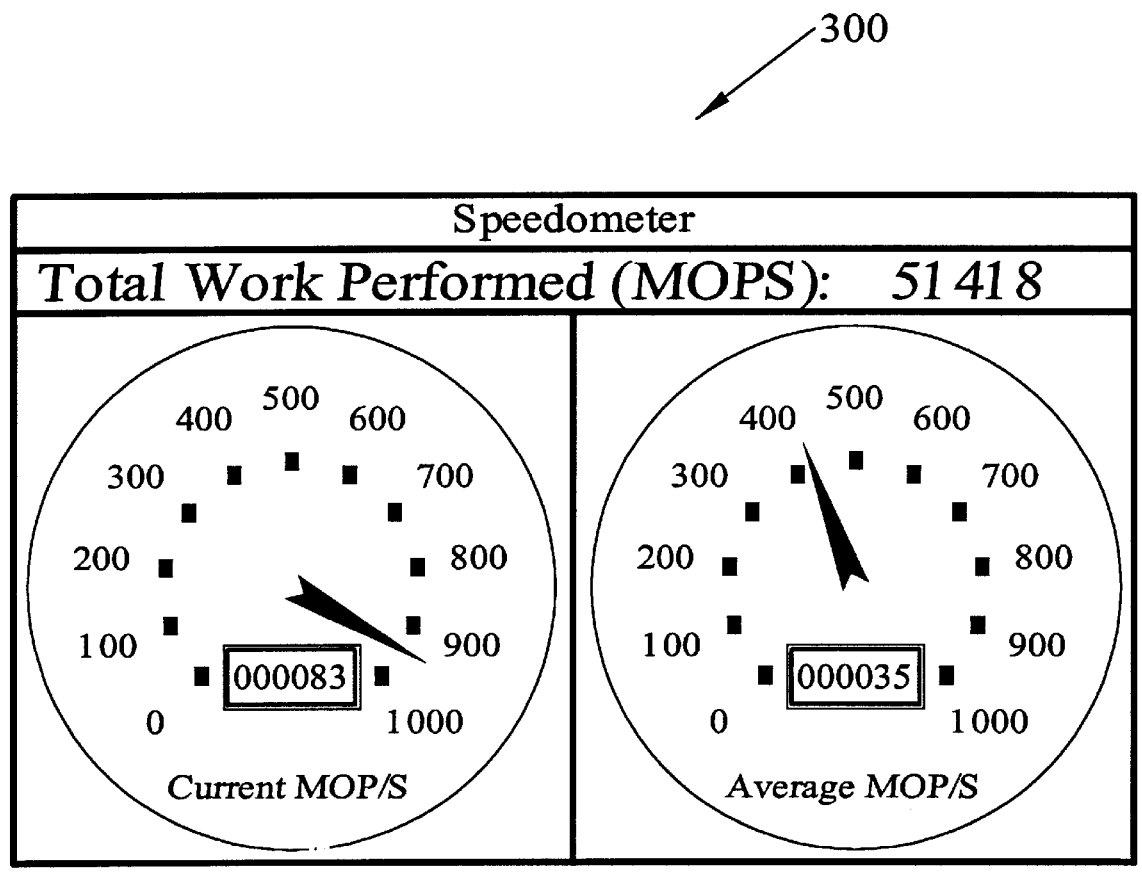
FIG. 3 is an illustration of a speedometer-odometer display to monitor the performance of a problem solution.

Administrator interface 204 monitors the performance of network 102. The monitoring function of administrator interface 204 may be implemented, for example, by a speedometer-odometer display 300 as illustrated in FIG. 3 to indicate MOPS (millions of operations per second) and percentage of problem completed. Administrator interface 204 may also be used to select whether a problem is to be run in real time or simulated from the sequence of computation characteristics. The simulation mode is useful for replaying the timing performance of past problems, projecting the performance of network 102 with new problems, and for training task performance predictor 208 in the assigning of problems submitted to network 102.

Scheduling strategies may incorporate multiple components, or criteria, on which to base their decisions. Most resource management systems (RMS's) use only two or three criteria in their scheduling strategies. The strategy employed by the scheduler determines the overall efficiency of the processor network. Scheduling strategies generally fall into three categories: load balancing, ad hoc (a scheduling strategy for a specific computer program or database), and optimization with respect to peak performance.

Load balancing strategies distribute tasks to machines based on the current processor load average; i.e., the least busy machine gets the next task. This is effective in "soaking" CPU cycles, and may be sufficient in clusters of homogeneous workstations or even on a homogeneous network of high performance computers. In a heterogeneous network load balancing may fall short of achieving optimum performance, because the maximum utilization of CPU cycles may be satisfied by assigning each processor a type of problem that requires the most amount of time to execute.

Ad hoc strategies require that the user specify where tasks should be assigned. Using this approach, near-optimal performance may be achieved by manually tuning a set of applications to a specific processor network, but typically lacks the flexibility and dynamic control to be practical for general purpose applications.

Peak performance strategies match jobs to machines based on the processor architecture. This approach does not take into account the fact that different sections of programming code achieve varying performance levels on different architectures. Consequently this approach lacks the rationale for assigning tasks to processors based on theoretical and empirical knowledge of which architecture is best suited to the entire task.

A computer program source code listing embodying an example of the scheduling framework of the present invention is attached as a microfiche in Appendix A.

Other modifications, variations, and applications of the present invention may be made in accordance with the above teachings other than as specifically described to practice the invention within the scope of the following claims.

I claim:

1. A scheduling framework for a heterogeneous computer network comprising:
   a task performance predictor for estimating an expected time to compute for a computational task submitted to the network for each computer within the network from a matrix of performance characteristics;
   a performance characteristics database of performance characteristics coupled to the task performance predictor including data objects describing the performance history of each computer within the network and compute characteristics for defining and evaluating compute time functions, network time functions, and floating point time functions;
   a scheduler coupled to the task performance predictor for assigning the computational task to a computer within the network for executing the computational task in a substantially minimum amount of time;
   and a controller for fitting the task into a current task queue for scheduling the task to run on the computer assigned.

2. The scheduling framework of claim 1 further comprising a controller coupled to the scheduler for relaying scheduling information to the network and responding to network events.

3. The scheduling framework for a heterogeneous computer network of claim 1 further comprising an administrator interface coupled to the task performance predictor for entering scheduling information, editing the performance characteristics database, selecting real-time or simulated operation, and for monitoring network performance.

4. The scheduling framework for a heterogeneous computer network of claim 1 further comprising a user interface coupled to the task performance predictor for specifying sequential constraints.

5. A computer program product comprising:
   a medium for embodying a computer program for input to a computer; and
   a computer program embodied in said medium for causing said computer to perform the following functions:
      finding an expected time to compute for a computational task from a matrix of performance characteristics and compute characteristics for each computer in a heterogeneous computer network;
      assigning the computational task to a computer in the network such that the minimum expected time to compute is substantially minimized;
      and fitting the task into a current task queue for scheduling the task to run on the computer assigned.

6. The computer program product of claim 5 further including the function of rescheduling tasks to adapt to changes in the network.

7. The computer program product of claim 5 further including the function of monitoring performance of the network on a display.

8. The computer program product of claim 5 further including the function of selecting one of real-time and simulated problem solving.

* * * * *